(12) United States Patent
Hong et al.

(10) Patent No.: US 11,471,016 B2
(45) Date of Patent: Oct. 18, 2022

(54) METHOD AND APPARATUS FOR EXECUTING CLEANING OPERATION

(71) Applicant: Samsung Electronics Co., Ltd., Suwon-si (KR)

(72) Inventors: Hyunseok Hong, Suwon-si (KR); Myungsik Kim, Suwon-si (KR); Minsu Hwangbo, Suwon-si (KR); Hyunsuk Kim, Suwon-si (KR); Seungbeom Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 756 days.

(21) Appl. No.: 16/410,501

(22) Filed: May 13, 2019

(65) Prior Publication Data

US 2019/0343354 A1 Nov. 14, 2019

Related U.S. Application Data

(60) Provisional application No. 62/670,311, filed on May 11, 2018.

(30) Foreign Application Priority Data

Oct. 26, 2018 (KR) .......................... 10-2018-0129357

(51) Int. Cl.
*A47L 9/28* (2006.01)
*A47L 9/04* (2006.01)
*G06N 20/00* (2019.01)

(52) U.S. Cl.
CPC ................. *A47L 9/281* (2013.01); *A47L 9/04* (2013.01); *A47L 9/2842* (2013.01);
(Continued)

(58) Field of Classification Search
CPC ........ A47L 2201/06; A47L 9/04; A47L 9/281; A47L 9/2826; A47L 9/2842;
(Continued)

(56) References Cited

U.S. PATENT DOCUMENTS

| 7,272,868 | B2 * | 9/2007 | Im | A47L 9/2852 |
| | | | | 15/340.1 |
| 9,233,472 | B2 * | 1/2016 | Angle | H04L 67/325 |

(Continued)

FOREIGN PATENT DOCUMENTS

| CN | 105395144 A | 3/2016 |
| JP | 2005-177459 A | 7/2005 |

(Continued)

*Primary Examiner* — Marc Carlson
(74) *Attorney, Agent, or Firm* — Jefferson IP Law, LLP

(57) ABSTRACT

A cleaning apparatus and a method of executing a cleaning operation are provided. The cleaning apparatus includes a sensor including a plurality of sensors, a memory configured to store at least one instruction, and a processor configured to execute the at least one instruction to control the cleaning apparatus. The processor is further configured to determine properties of a pollutant on a movement path of the cleaning apparatus by using the sensor, determine a cleaning operation of removing the pollutant, based on the determined properties of the pollutant, and execute the determined cleaning operation.

18 Claims, 16 Drawing Sheets

(52) U.S. Cl.
CPC ........... *A47L 9/2857* (2013.01); *A47L 9/2894* (2013.01); *G06N 20/00* (2019.01); *A47L 2201/06* (2013.01)

(58) Field of Classification Search
CPC .... A47L 9/2847; A47L 9/2852; A47L 9/2857; A47L 9/2894; G06N 20/00
See application file for complete search history.

(56) References Cited

U.S. PATENT DOCUMENTS

| | | | | |
|---|---|---|---|---|
| 9,357,893 | B2* | 6/2016 | Lee | G05D 1/0011 |
| 9,380,922 | B2* | 7/2016 | Duffley | G05D 1/0016 |
| 9,436,186 | B2* | 9/2016 | Oh | G05D 1/0251 |
| 9,921,586 | B2* | 3/2018 | Chiappetta | H02J 50/10 |
| 10,111,566 | B2* | 10/2018 | Ahn | G05D 1/0038 |
| 10,368,708 | B2* | 8/2019 | Cornelissen | A47L 9/2852 |
| 10,383,497 | B2* | 8/2019 | Han | A47L 11/4011 |
| 10,624,516 | B2* | 4/2020 | Cudzilo | G05B 19/042 |
| 10,688,652 | B2* | 6/2020 | Hummel | A47L 9/12 |
| 10,884,421 | B2* | 1/2021 | Brede | G05D 1/0219 |
| 10,996,682 | B2* | 5/2021 | Xie | A47L 9/2857 |
| 2012/0259481 | A1* | 10/2012 | Kim | G05D 1/0044 701/25 |
| 2018/0021942 | A1* | 1/2018 | Hummel | G05D 1/0242 700/253 |
| 2018/0055312 | A1* | 3/2018 | Jung | G06T 19/006 |
| 2018/0299899 | A1* | 10/2018 | Suvarna | H04W 16/20 |
| 2019/0239709 | A1* | 8/2019 | Thomas | B25J 9/1694 |
| 2021/0100416 | A1* | 4/2021 | Choi | A47L 9/2831 |

FOREIGN PATENT DOCUMENTS

| | | | |
|---|---|---|---|
| KR | 10-2007-0045467 A | | 5/2007 |
| KR | 20100109289 A | * | 10/2010 |
| KR | 10-2011-0109705 A | | 10/2011 |
| KR | 10-1526117 B1 | | 6/2015 |

* cited by examiner

FIG. 6

| PROPERTIES OF POLLUTANT | EXAMPLES OF CLEANING OPERATION |
|---|---|
| LIQUID | DRIVE INSTALLED RAG/ CALL EXTERNAL CLEANING APPARATUS/DETOUR |
| METAL | ADJUST SUCTION FORCE TO INCREASE/ INCREASE SUCTION TIME |
| VISCOSITY | DRIVE BRUSH AT HIGH SPEED AND/ INCREASE OPERATION TIME |

METHOD AND APPARATUS FOR EXECUTING CLEANING OPERATION

CROSS-REFERENCE TO RELATED APPLICATION(S)

This application is based on and claims priority under 35 U.S.C. § 119(e) of a U.S. Provisional application Ser. No. 62/670,311, filed on May 11, 2018, in the U.S. Patent and Trademark Office, and under 35 U.S.C. § 119(a) of a Korean patent application number 10-2018-0129357, filed on Oct. 26, 2018, in the Korean Intellectual Property Office, the disclosure of which is incorporated by reference herein in its entirety.

BACKGROUND

1. Field

The disclosure relates to a robotic cleaning apparatus for executing a cleaning operation based on properties of pollutants, and a method of executing the cleaning operation.

2. Description of Related Art

Artificial intelligence (AI) systems are computer systems which realize human-like intelligence and systems by which a machine self-learns, makes decisions and gets smarter, unlike existing rule-based smart systems. The more frequently these AI systems are used, the better the degrees of recognition of the AI systems become, and the more accurately the AI systems understand user preferences. Thus, existing rule-based smart systems have replaced with deep-learning-based AI systems.

AI technology includes machine learning (deep learning) and element techniques using machine learning.

Machine learning is an algorithm technique of classifying and learning attributes of input data independently, and element techniques use machine learning algorithms, such as deep learning and imitate functions of the human brain, for example, recognition, determination, etc. The element techniques are categorized into technical fields including language appreciation, visual appreciation, reasoning/prediction, knowledge expression, motion control, and the like.

AI technology may be utilized in various fields. Language appreciation is a technique of recognizing human languages/characters and applying/processing the same, and includes natural language processing, machine translation, a dialog system, question and answer, voice recognition/synthesis, and the like. Visual appreciation is a technique of recognizing and processing objects in the manner of human visual perception, and includes object recognition, object tracking, video searching, human recognition, scene appreciation, space appreciation, image enhancement, and the like. Reasoning and prediction is a technique of determining information and logically reasoning and predicting information and includes knowledge/probability-based reasoning, optimization prediction, preference-based planning, recommendation, and the like. Knowledge expression is a technique of automatically processing experience information of persons into knowledge data and includes knowledge building (data production/classification), knowledge management (data utilization), and the like. Motion control is a technique of controlling automatic driving of vehicles and motion of robots and includes movement control (navigation, collision, driving), manipulation control (action control), and the like.

Meanwhile, there is a demand for research into a method that enables robotic cleaning apparatuses to more effectively remove pollutants while moving independently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robotic cleaning apparatus for executing a cleaning operation based on a property of a pollutant and a method of executing the cleaning operation.

Another aspect of the disclosure is to provide at least one non-transitory computer-readable recording medium having recorded thereon a program which, when executed by a computer, executes the method. Technical problems of the disclosure are not limited thereto, and there may be other technical problems.

Additional aspects will be set forth in part in the description which follows and, in part, will be apparent from the description, or may be learned by practice of the presented embodiments.

In accordance with an aspect of the disclosure, a cleaning apparatus is provided. The cleaning apparatus includes a sensor including a plurality of sensors, a memory configured to store at least one instruction, and a processor configured to execute the at least one instruction to control the cleaning apparatus. The processor is further configured to determine properties of a pollutant on a movement path of the cleaning apparatus by using the sensor, determine a cleaning operation of removing the pollutant, based on the determined properties of the pollutant, and execute the determined cleaning operation.

In accordance with another aspect of the disclosure, an operating method of a cleaning apparatus is provided. The method includes determining properties of a pollutant on a movement path of the cleaning apparatus by using a sensor including a plurality of sensors, determining a cleaning operation of removing the pollutant, based on the determined properties of the pollutant, and executing the determined cleaning operation.

In accordance with another aspect of the disclosure, at least one non-transitory computer-readable recording medium having recorded thereon a program which, when executed by a computer, executes the method is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram of a method by which a cleaning apparatus determines a cleaning operation according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when a component is referred to as being "connected to" another component, the component can be "directly connected to" the other component or "electrically connected" thereto with intervening components therebetween. It will be further understood that the terms "comprises" and/or "comprising" used herein specify the presence of stated features or components, but do not preclude the presence or addition of one or more other features or components.

Hereinafter, the disclosure will be described in detail with reference to the attached drawings.

Figure 1:
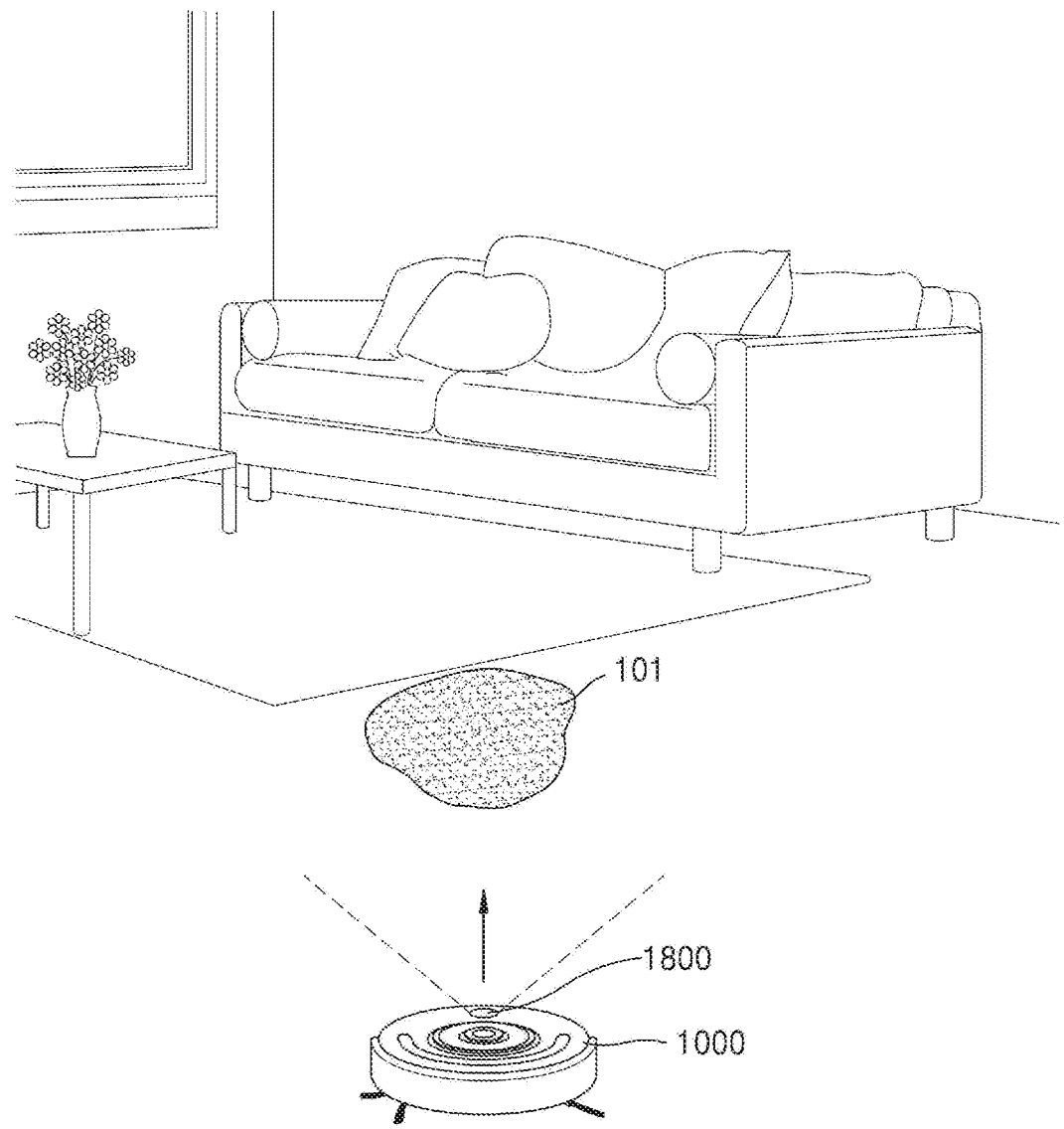
FIG. 1 is a diagram illustrating an operating method of a cleaning apparatus according to an embodiment of the disclosure.

FIG. 1 is a diagram illustrating an operating method of a cleaning apparatus according to an embodiment of the disclosure.

Referring to FIG. 1, according to an embodiment of the disclosure, a cleaning apparatus (1000 of FIGS. 1 and 10) (hereinafter, referred to as the 'cleaning apparatus 1000') may include a sensor (1800 of FIGS. 1 and 10) (hereinafter, referred to as the 'sensor 1800') including sensors. The cleaning apparatus 1000 may determine properties of a pollutant 101 by using the sensor 1800.

According to an embodiment of the disclosure, the cleaning apparatus 1000 is a robot apparatus that moves by itself by using wheels and the like and may execute a cleaning operation while moving in a place (e.g., a house, a space, for example, an office, where cleaning is required, etc.).

According to an embodiment of the disclosure, the properties of the pollutant 101 may indicate types, materials, physical properties, etc. of the pollutant 101. For example, the properties of the pollutant 101 may be liquid, metal, fabric, a glutinous material, and the like. However, the properties are not limited thereto.

According to an embodiment of the disclosure, the sensor 1800 may sense surroundings of the cleaning apparatus 1000 while the cleaning apparatus 1000 moves. For example, the sensor 1800 may sense the existence of a pollutant on a movement path of the cleaning apparatus 1000. The sensor 1800 may sense the intensity of reflection signals reflected from the pollutant on the movement path. In addition, the sensor 1800 may sense a distance to the pollutant. For example, the sensor 1800 may include an ultra-wide band (UWB) sensor 211 (FIG. 11), a radio frequency (RF) sensor 213 (FIG. 11), an infrared ray (IR) sensor 214 (FIG. 11), an ultrasonic sensor 212 (FIG. 11), a camera 1500 (FIG. 10), a distance sensor, and the like. However, sensors included in the sensor 1800 are not limited thereto.

According to an embodiment of the disclosure, based on a sensing result sensed by the sensor 1800 including the sensors, the cleaning apparatus 1000 may determine the existence of the pollutant on the movement path of the cleaning apparatus 1000 and determine the properties of the pollutant (e.g., liquid, metal, fabric, a glutinous substance, etc.).

In addition, according to an embodiment of the disclosure, the cleaning apparatus 1000 may determine an optimum cleaning operation to remove the pollutant and may execute the determined cleaning operation, based on the determined properties of the pollutant.

According to an embodiment of the disclosure, based on the properties of the pollutant, the cleaning apparatus 1000 may adjust at least one of a suction force of sucking the pollutant, a suction time taken to suck the pollutant, a movement velocity of a robotic cleaning apparatus while the robotic cleaning apparatus sucks the pollutant, or the number of times that an operation of sucking the pollutant is repeated. Throughout the disclosure, the expression "at least one of a, b or c" indicates only a, only b, only c, both a and b, both a and c, both b and c, all of a, b, and c, or variations thereof.

According to an embodiment of the disclosure, the cleaning apparatus 1000 does not operate in the same cleaning mode, but may identify the properties of a pollutant and determine a cleaning operation of effectively removing the pollutant depending on the properties of the pollutant. The cleaning apparatus 1000 may adjust the suction force to increase when a stronger suction force is required and to decrease when it is possible to remove the pollutant with a low suction force, depending on the properties of the pollutant.

For example, when it is determined that the pollutant on the movement path is a metal object, the cleaning apparatus 1000 may use an UWB sensor and a camera and may adjust the suction force of the cleaning apparatus 1000 to increase to suck the metal object.

According to an embodiment of the disclosure, the cleaning apparatus 1000 may adjust at least one of the suction force, the suction time, the movement velocity, or the number of times that the operation is repeated depending on the properties of the pollutant, thereby reducing an amount of power unnecessarily consumed by batteries and improving the efficiency of the batteries.

In addition, according to an embodiment of the disclosure, depending on the properties of the dirt, the cleaning apparatus 1000 may adjust at least one of the suction force, the suction time, the movement velocity, or the number of times that the operation is repeated and thus may adjust noise generated by the cleaning apparatus 1000.

Figure 2:
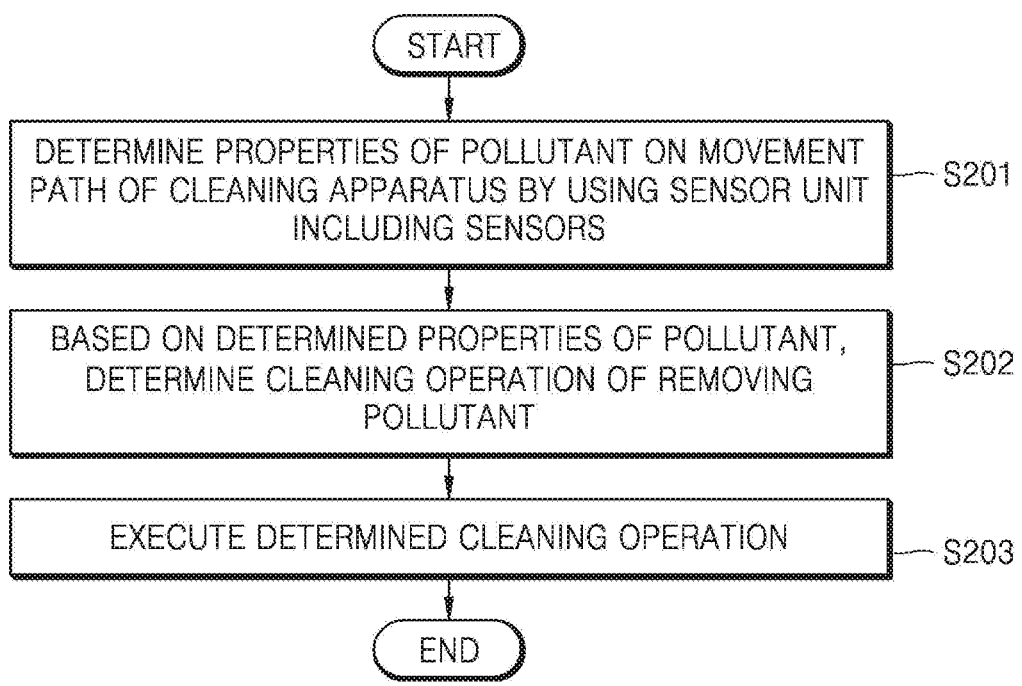
FIG. 2 is a flowchart of a method by which a cleaning apparatus executes a cleaning operation according to an embodiment of the disclosure.
Figure 3:
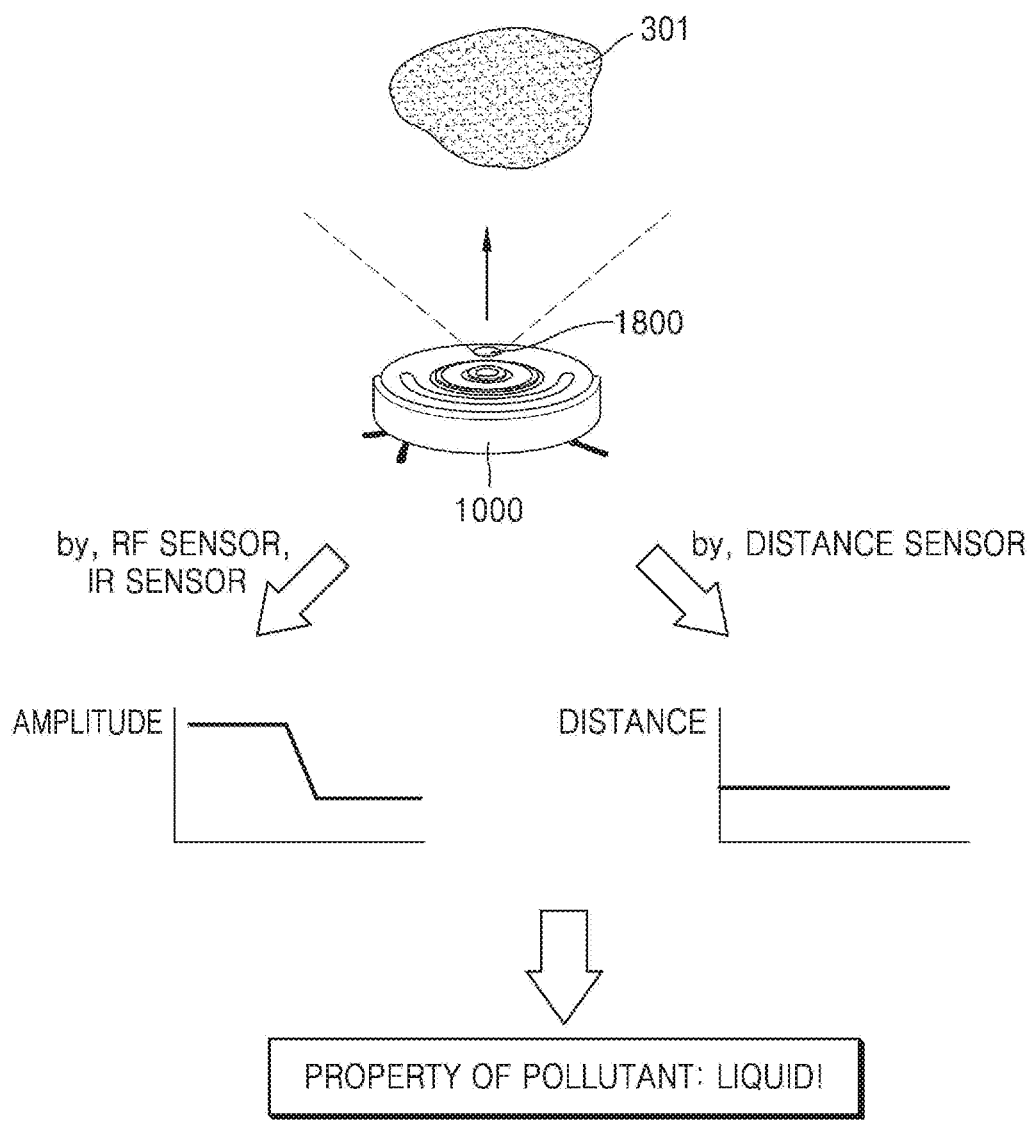
FIG. 3 is a diagram of a method by which a cleaning apparatus determines a property of pollutants according to an embodiment of the disclosure.
Figure 4:
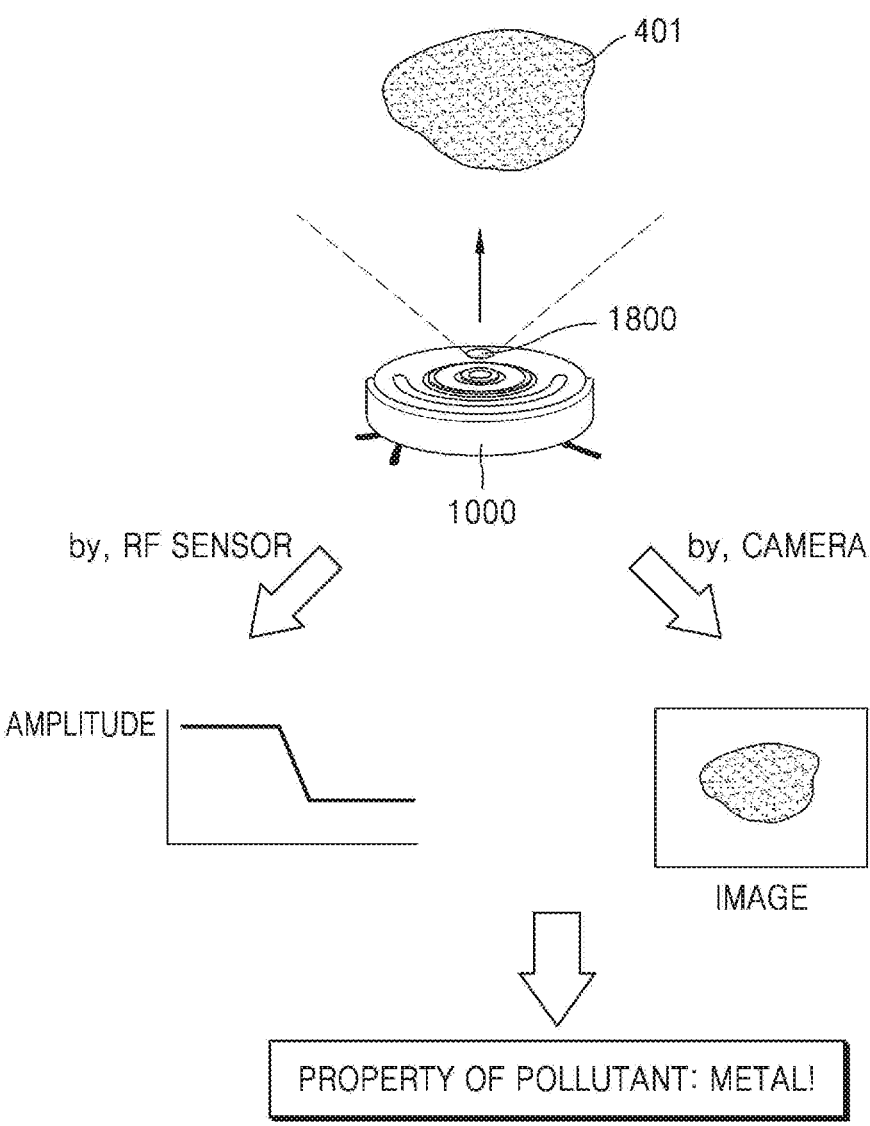
FIG. 4 is a diagram of a method by which a cleaning apparatus determines a property of pollutants according to an embodiment of the disclosure.
Figure 5:
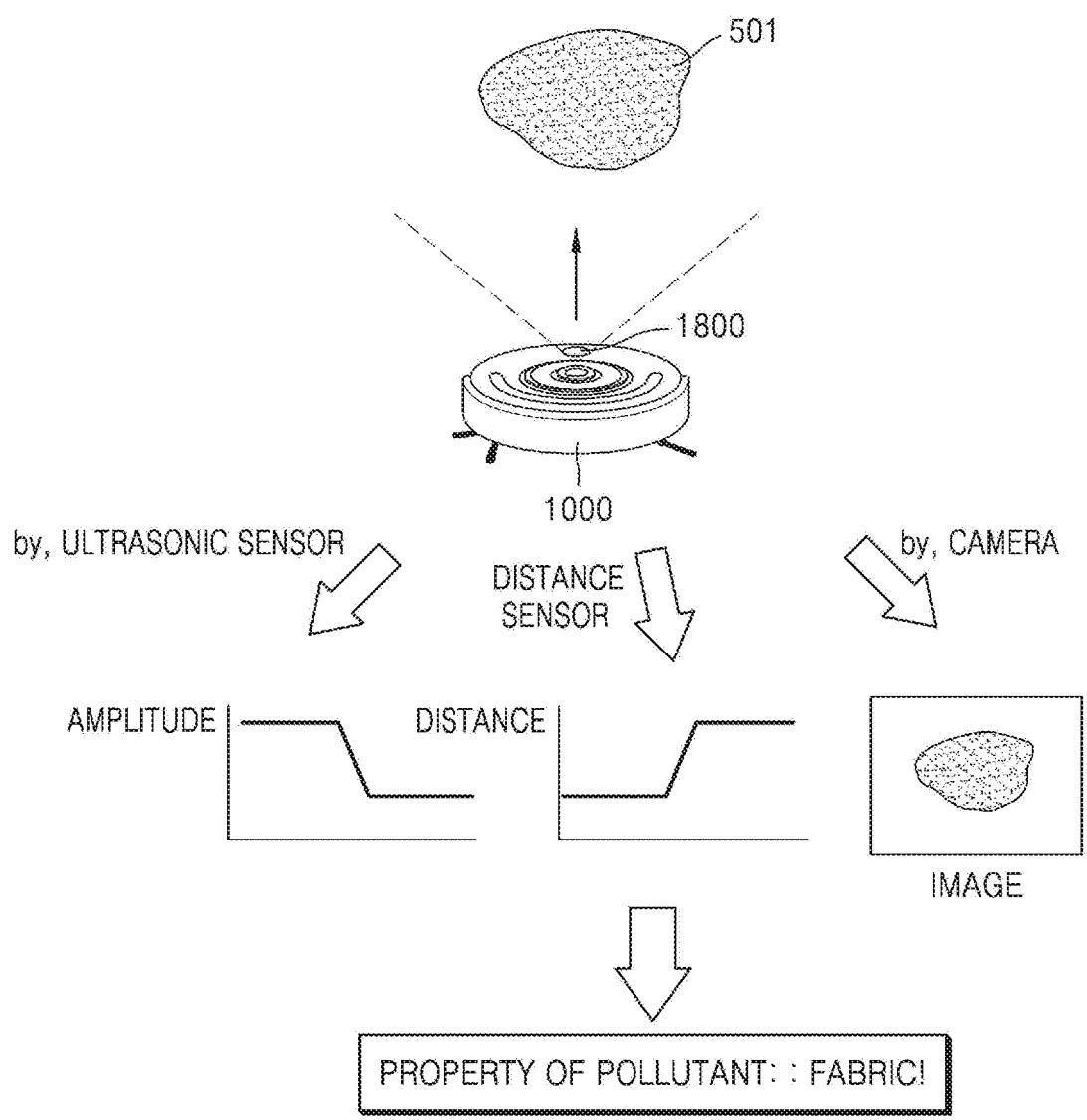
FIG. 5 is a diagram of a method by which a cleaning apparatus determines a property of pollutants according to an embodiment of the disclosure.

FIG. 2 is a flowchart of a method by which a cleaning apparatus executes a cleaning operation according to an embodiment of the disclosure. FIG. 3 is a diagram of a method in which a cleaning apparatus determines properties of a pollutant according to an embodiment of the disclosure. FIG. 4 is a diagram of a method in which a cleaning apparatus determines properties of a pollutant according to an embodiment of the disclosure. FIG. 5 is a diagram of a method in which a cleaning apparatus determines properties of a pollutant according to an embodiment of the disclosure.

FIG. 6 is a diagram of a method in which a cleaning apparatus determines a cleaning operation according to an embodiment of the disclosure. The flowchart of FIG. 2 will be described with reference to FIGS. 3, 4, 5, and 6.

Referring to FIG. 2, in operation S201, the cleaning apparatus 1000 may use the sensor 1800 including the sensors and may determine the properties of the pollutant on the movement path of the cleaning apparatus 1000.

According to an embodiment of the disclosure, while moving, the cleaning apparatus 1000 may use the sensors and may sense the pollutant on the movement path.

According to an embodiment of the disclosure, based on priorities that are set in advance, the cleaning apparatus 1000 may sequentially drive the sensors and may determine the properties of the pollutant.

For example, the cleaning apparatus 1000 may determine the properties of the pollutant by driving the UWB sensor 211 (FIG. 11) first, and when it is determined that another sensor needs to be additionally driven for accurate sensing, the cleaning apparatus 1000 may drive the camera 1500 (FIG. 11) to determine the properties of the pollutant. However, one or more embodiments of the disclosure are not limited thereto.

In addition, according to an embodiment of the disclosure, the cleaning apparatus 1000 may simultaneously drive the sensors and thus may determine the properties of the pollutant.

Figure 11:
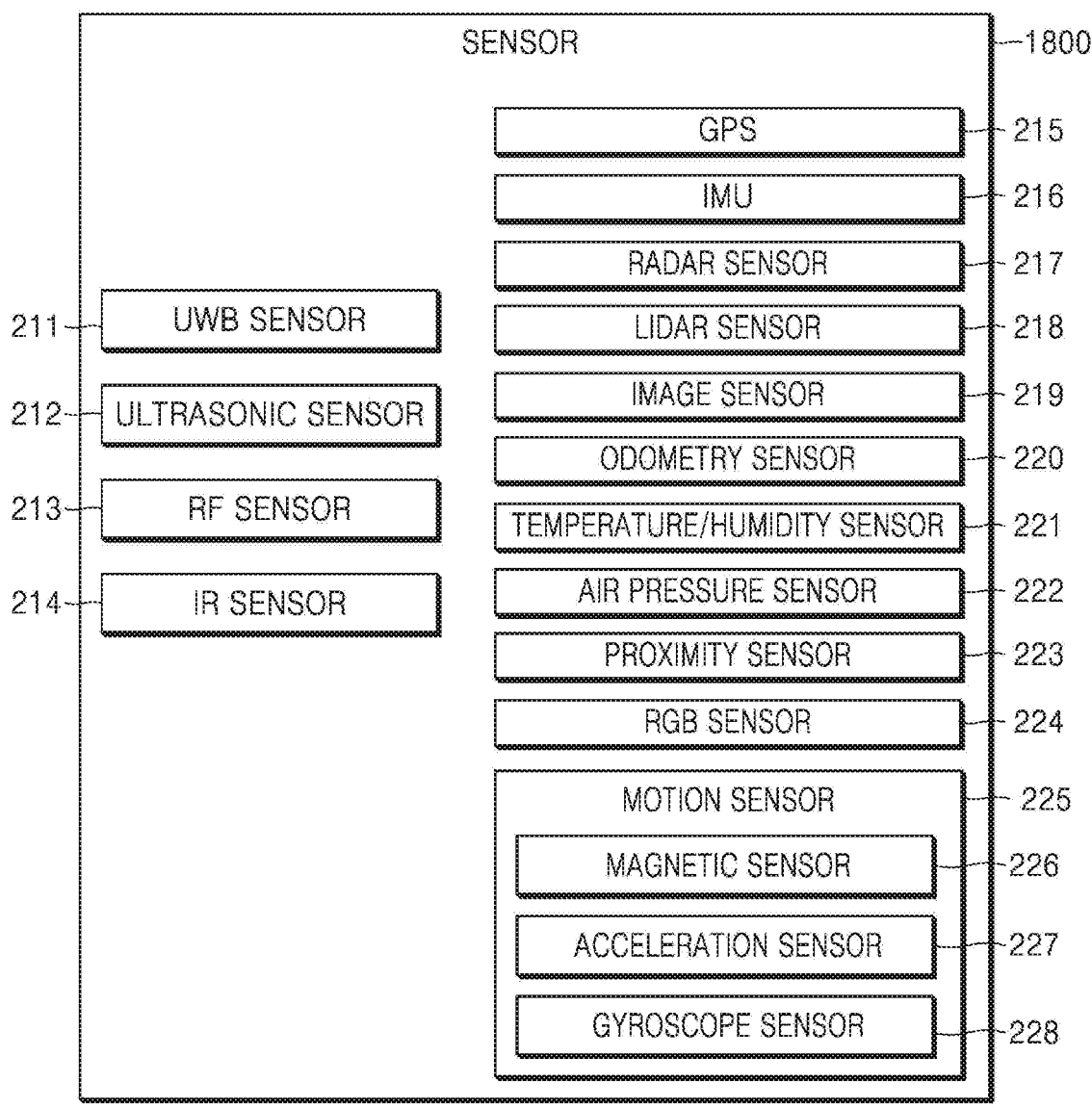
FIG. 11 is a block diagram of a sensor according to an embodiment of the disclosure.

For example, the cleaning apparatus 1000 may determine the properties of the pollutant based on a sensing result that is obtained by simultaneously driving the sensors, for example, the UWB sensor 211 (FIG. 11), the camera 1500 (FIG. 11), and the ultrasonic sensor 212 (FIG. 11). However, one or more embodiments of the disclosure are not limited thereto.

FIGS. 3, 4, and 5 show examples in which the cleaning apparatus 1000 determines the properties of the pollutant by using the sensor 1800.

According to an embodiment of the disclosure, the cleaning apparatus 1000 may emit RF and IR rays by using the RF sensor 213 (FIG. 11) and the IR sensor 214 (FIG. 11) and may detect reflection signals reflected from an object (a pollutant), thereby determining properties (e.g., physical properties, materials, etc.) of the object according to the reflectivity. According to an embodiment of the disclosure, to determine the properties of the object, absorption ratios of the RF and IR rays may differ according to respective properties (e.g., physical properties, materials, etc.) of the object.

Referring to FIG. 3, when it is sensed that the RF and IR rays emitted from the RF and IR sensors of the cleaning apparatus 1000 are greatly reduced and the distance sensor senses that a distance between the ground and the pollutant is small, the cleaning apparatus 1000 may determine the property of a pollutant 301 as liquid. Based on the fact that liquid absorbs the RF and IR rays well and the distance between a surface of the liquid and the ground is small, the property of the pollutant 301 may be determined as liquid.

Referring to FIG. 4, for example, because the reflectivity of RF rays emitted from the RF sensor of the cleaning apparatus 1000 is high and an object is extracted from an image captured by the camera, a property of a pollutant 401 may be determined as metal. In the case of metal, based on the high reflectivity of the RF rays, a shape, a size, a thickness, etc. of the object extracted from the image captured by the camera, the property of the pollutant 401 may be determined as metal.

Referring to FIG. 5, for example, when it is sensed that reflection signals of ultrasonic waves emitted from the ultrasonic sensor are greatly reduced and a sensing error of the distance sensor is great and when a sensing result according to the extraction of an object from an image captured by the camera is considered, the cleaning apparatus 1000 may determine a property of a pollutant 501 to be fabric. In the case of fabric, based on the reduction of reflection signals due to the scattered reflection, a large error made by the distance sensor due to an increase in surface noise resulting from the scattered reflection, and the extraction of an object having a pattern different from that of the ground from the captured image, the cleaning apparatus 1000 may determine the property of the pollutant 501 to be fabric.

In addition, for example, when the cleaning apparatus 1000 identifies the existence of a pollutant according to the extraction of the object from the image captured by the camera and drives a brush (not shown) installed in the cleaning apparatus 1000, but a movement range of the brush is less than a preset standard, the cleaning apparatus 1000 may determine that a physical property of the pollutant is a glutinous material.

FIGS. 3, 4, and 5 are diagrams for explaining an embodiment of the disclosure. However, one or more embodiments of the disclosure are not limited thereto.

In operation S202 of FIG. 2, the cleaning apparatus 1000 may determine a cleaning operation of removing the pollutant based on the determined properties of the pollutant.

According to an embodiment of the disclosure, based on the determined properties of the pollutant, the cleaning apparatus 1000 may adjust at least one of the suction force of sucking the pollutant, the suction time taken to suck the pollutant, the movement velocity of the robotic cleaning apparatus while the robotic cleaning apparatus sucks the pollutant, or the number of times that an operation of sucking the pollutant is repeated.

In addition, according to an embodiment of the disclosure, the cleaning apparatus 1000 may drive at least one of the brush (not shown) or a rag (not shown) installed in the cleaning apparatus 1000, based on the determined properties of the pollutant.

In addition, according to an embodiment of the disclosure, based on the determined properties of the pollutant, the cleaning apparatus 1000 may call an external cleaning apparatus (not shown) through a communicator 1200 (FIG. 10) to ensure that the external cleaning apparatus removes the pollutant.

FIG. 6 illustrating a cleaning operation that may be determined based on the determined properties of the pollutant according to an embodiment of the disclosure.

Referring to FIG. 6, for example, when the property of the pollutant is determined as liquid, the cleaning apparatus 1000 may drive the rag (not shown) installed in the cleaning apparatus 1000 as a cleaning operation of removing the liquid. For example, the cleaning apparatus 1000 may temporarily stop an operation of absorbing the pollutant, remove the liquid by using the rag and then resume the operation of absorbing the pollutant.

Also, for example, when the rag is installed in a rear direction of the cleaning apparatus 100, the cleaning apparatus 1000 may rotate to ensure that the rag removes the pollutant or may move in a direction in which the rag removes the pollutant.

Also, for example, the cleaning apparatus 1000 may call through the communicator 1200 (FIG. 10) an external cleaning apparatus (not shown) that may interwork with the cleaning apparatus 1000. For example, the cleaning apparatus 1000 may call another cleaning apparatus (not shown), which is realized to absorb the liquid, to make the other cleaning apparatus remove the liquid.

Also, for example, when it is determined that the property of the pollutant is determined as liquid, the cleaning apparatus 1000 may detour the pollutant.

Figure 10:
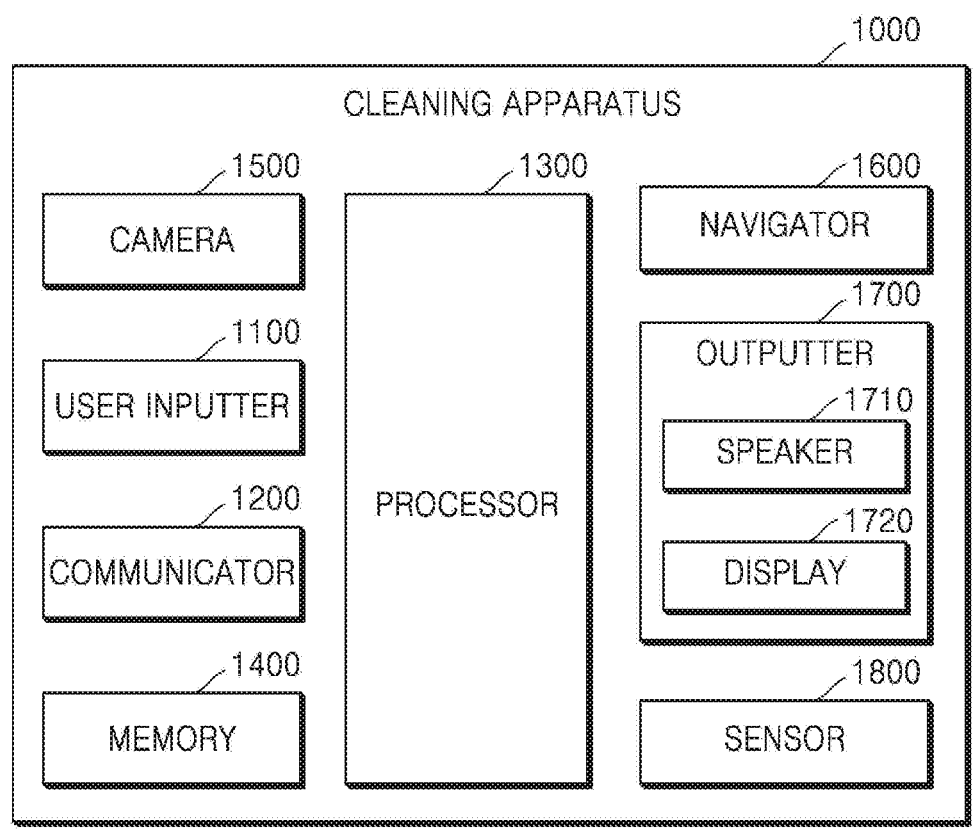
FIG. 10 is a block diagram of a cleaning apparatus according to an embodiment of the disclosure.

Also, the cleaning apparatus 1000 may output information regarding the property of the pollutant through a speaker 1710 (FIG. 10). For example, the cleaning apparatus 1000 may output through the speaker 1710 information that informs a user that the liquid needs removing by the rag, etc.

Also, for example, when it is determined that the property of the pollutant is determined as metal, the cleaning apparatus 1000 may adjust the suction force of sucking the pollutant to increase. Also, for example, when it is determined that the property of the pollutant is determined as metal, the cleaning apparatus 1000 may increase an operation time taken to absorb the pollutant.

Also, for example, when it is determined that the property of the pollutant is determined as a glutinous material, the cleaning apparatus 1000 may drive the brush (not shown) installed in the cleaning apparatus 1000 at a high speed so as to detach the pollutant from the ground and then may adjust the suction force to increase, thereby removing the pollutant.

Also, for example, when it is determined that the property of the pollutant is determined as a glutinous material, the cleaning apparatus 1000 may increase the operation time in an area close to the sensed pollutant.

In operation S203 of FIG. 2, the cleaning apparatus 1000 may execute the determined cleaning operation. According to an embodiment of the disclosure, the cleaning apparatus 1000 may execute the cleaning operation determined in operation S202 and thus may remove the pollutant.

In addition, according to an embodiment of the disclosure, the cleaning apparatus 1000 may perform the cleaning operation, and when it is determined by using the sensor 1800 that at least some of the pollutant remains, the cleaning apparatus 1000 may re-execute at least part of the cleaning operation.

For example, the cleaning apparatus 1000 may execute the cleaning operation determined based on the property of the pollutant and may re-sense, by using the sensor 1800, whether the pollutant remains in an area where the cleaning operation is executed. When it is determined that at least some of the pollutant remains, the cleaning apparatus 1000 may determine the cleaning operation based on the remaining pollutant and may execute the determined cleaning operation.

Also, for example, the cleaning apparatus 1000 may execute the cleaning operation determined based on the property of the pollutant and may sense the rear direction while keeping moving in a preset movement direction, thereby identifying a cleaning result in an area where the cleaning operation is executed.

Also, for example, the cleaning apparatus 1000 may determine whether the pollutant is clearly removed by comparing an amount of the pollutant is sensed before the cleaning operation is performed with an amount of the pollutant sensed by using a dust detection sensor (not shown) included in the image apparatus 1000 and absorbed by the image apparatus 1000 after the cleaning operation is executed.

FIGS. 2, 3, 4, 5, and 6 are diagrams for explaining an embodiment of the disclosure. However, one or more embodiments of the disclosure are not limited thereto.

Figure 7:
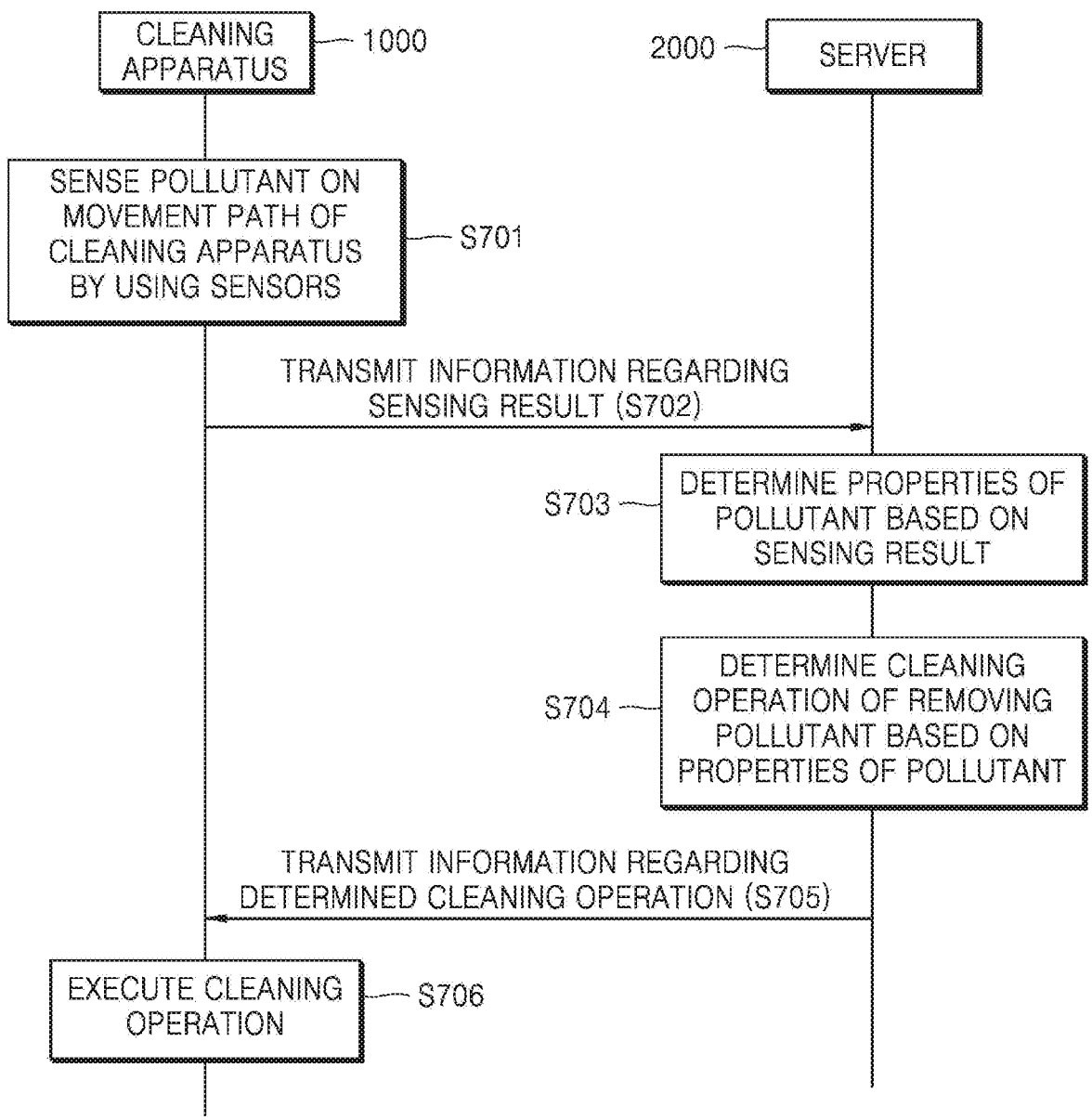
FIG. 7 is a flowchart of a method of executing a cleaning operation when a cleaning apparatus interworks with a server according to an embodiment of the disclosure.

FIG. 7 is a flowchart of a method of executing a cleaning operation as the cleaning apparatus interworks with a server according to an embodiment of the disclosure.

FIG. 7 is a flowchart of a method of executing a cleaning operation when a cleaning apparatus interworks with a server according to an embodiment of the disclosure.

Referring to FIG. 7, in operation S701, the cleaning apparatus 1000 may sense a pollutant on a movement path of the cleaning apparatus 1000 by using the sensors.

According to an embodiment of the disclosure, while moving in a cleaning space, the cleaning apparatus 1000 may sense the pollutant by using the sensor 1800. The example, in which the pollutant is sensed by using the sensors, is described while operation S201 of FIG. 2 is described, and thus repeated descriptions will be omitted.

In operation S702, the cleaning apparatus 1000 may transmit information regarding a sensing result to the server 2000.

According to an embodiment of the disclosure, the cleaning apparatus 1000 may transmit the information regarding the sensing result to the server 2000 through the communicator 1200 (FIG. 10), the information including, for example, an image captured by the camera, information regarding the reflectivity, etc. according to a size of a reception signal obtained by the RF sensor.

In operation S703, the server 2000 may determine the properties of the pollutant based on the sensing result.

According to an embodiment of the disclosure, the server 2000 may determine the properties (e.g., liquid, metallic properties, viscosity, etc.) of the pollutant, based on the sensing result received from the cleaning apparatus 1000.

The example in which the properties of the pollutant are determined based on the sensing result output by the sensors is described while operation S201 of FIG. 2 is described, and thus repeated descriptions will be omitted.

In operation S704, the server 2000 may determine the cleaning operation for removing a pollutant, based on the properties of the pollutant.

The example in which the cleaning operation is determined based on the properties of the pollutant is described while operation S202 of FIG. 2 is described, and thus repeated descriptions will be omitted.

Figure 12:
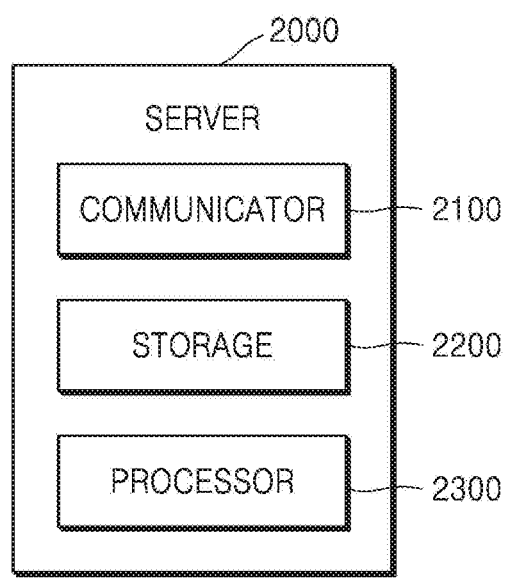
FIG. 12 is a block diagram of a server according to an embodiment of the disclosure.

In operation S705, the server 2000 may transmit information regarding the determined cleaning operation to the cleaning apparatus 1000 through a communicator 2100 (FIG. 12).

In operation S706, the cleaning apparatus 1000 may execute the cleaning operation. According to an embodiment of the disclosure, the cleaning apparatus 1000 may execute the cleaning operation based on the information regarding the cleaning operation which is received from the server 2000.

FIG. 7 illustrates, where while interworking with the cleaning apparatus 1000, the server 2000 determines the properties of the pollutant and determines the cleaning operation based on the properties of the pollutant. However, one or more embodiments of the disclosure are not limited thereto.

According to an embodiment of the disclosure, the cleaning apparatus 1000 may determine the properties of the pollutant based on the sensing result of sensing the pollutant, and the server 2000 may determine the cleaning operation based on the properties of the pollutant.

In addition, according to an embodiment of the disclosure, the server 2000 may determine the properties of the pollutant based on the sensing result of sensing the pollutant which is received from the cleaning apparatus 1000, and the cleaning apparatus 1000 may determine the cleaning operation based on the properties of the pollutant.

Figure 8:
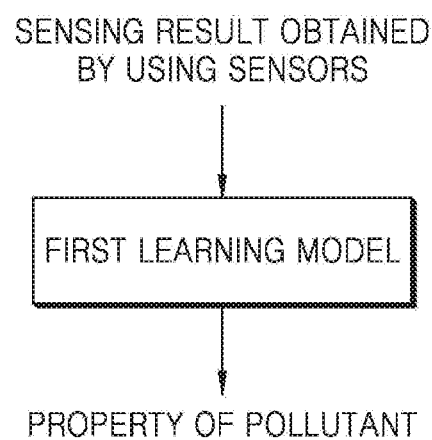
FIG. 8 is a diagram illustrating a property of pollutants is determined by a learning model according to an embodiment of the disclosure.

FIG. 8 is a diagram illustrating properties of a pollutant being determined by a learning model according to an embodiment of the disclosure.

Referring to FIG. 8, according to an embodiment of the disclosure, the cleaning apparatus 1000 may apply the sensing result using the sensor 1800 to at least one learning model that is learned to determine properties of a pollutant, thereby determining the properties of the pollutant.

Referring to FIG. 8, for example, when data regarding a sensing result of sensing the pollutant by using the sensors is applied to a first learning model, the cleaning apparatus 1000 may determine the properties of the pollutant.

According to an embodiment of the disclosure, the first learning model may be a learning model that is learned to determine the properties of the pollutant. For example, the first learning model may learn the sensing result using the sensors and the data regarding the properties of the pollutant which are determined based on the sensing result. The first learning model may determine the properties of the pollutant based on the learned data when data regarding the sensing result using the sensors is input.

Figure 9:
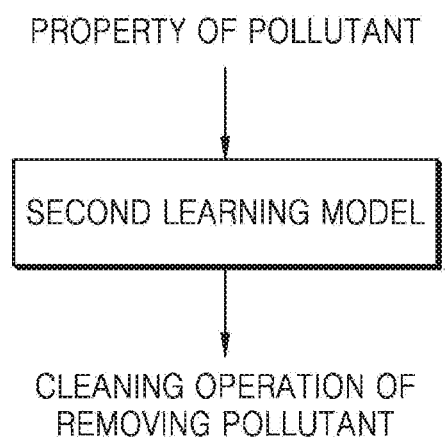
FIG. 9 is a diagram illustrating a cleaning operation is determined by a learning model according to an embodiment of the disclosure.

FIG. 9 is a diagram illustrating a cleaning operation being determined by a learning model according to an embodiment of the disclosure.

According to an embodiment of the disclosure, the cleaning apparatus 1000 may apply the properties of the pollutant to at least one learning model that is learned to determine a cleaning operation of removing a pollutant and thus may determine the cleaning operation of removing the pollutant.

Referring to FIG. 9, for example, when the data regarding the properties of the pollutant is applied to a second learning model, the cleaning operation of removing the pollutant may be determined.

According to an embodiment of the disclosure, the second learning model may be a learning model that is learned to determine the cleaning operation of removing the pollutant. For example, the second learning model may learn the properties of the pollutant and data regarding a cleaning result that is obtained after the cleaning operation, which is determined based on the properties of the pollutant, is performed. The second learning model may determine an optimum cleaning operation based on the learned data when the properties of the pollutant are input.

FIGS. 8 and 9 show examples of determining the properties of the pollutant and determining the cleaning operation of removing the pollutant by using various types of learning models. However, one or more embodiments of the disclosure are not limited thereto.

Types and numbers of learning models which are different from those shown in FIGS. 8 and 9 may be used to determine properties of a pollutant and cleaning operations of removing a pollutant. In addition, different and various pieces of information may be input to different learning models.

FIG. 10 is a block diagram of a cleaning apparatus according to an embodiment of the disclosure.

Referring to FIG. 10, a cleaning apparatus 1000 may include a user inputter 1100, the communicator 1200, a memory 1400, the camera 1500, a navigator 1600, an outputter 1700, the sensor 1800, and a processor 1300, and the outputter 1700 may include a speaker 1710 and a display 1720.

The user inputter 1100 may receive a user input for controlling the operation of the cleaning apparatus 1000. For example, the user inputter 1100 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, a jog switch, and the like. However, the user inputter 1100 is not limited thereto.

The communicator 1200 may include the server 2000 and at least one communication module for communication with an external device (not shown). For example, the communicator 1200 may include a short-range wireless communication unit and a mobile communication unit. The short-range wireless communication unit may include a Bluetooth communication unit, a Bluetooth low energy (BLE) communication unit, a near field communication unit, a wireless local area network (WLAN) communication unit, a ZigBee communication unit, an infrared data association (IrDA) communication unit, a Wi-Fi direct (WFD) communication unit, an UWB communication unit, an Ant+communication, and the like. However, one or more embodiments of the disclosure are not limited thereto. The mobile communication unit transmits/receives wireless signals to/from at least one of a base station, an external terminal, or a server via a wireless communication network. Here, the wireless signals may include various types of data according to text/multimedia message reception/transmission, a voice call signal, and a video call signal.

The memory 1400 may store programs for controlling the operation of the cleaning apparatus 1000. The memory 1400 may include at least one instruction for controlling the operation of the cleaning apparatus 1000.

According to an embodiment of the disclosure, the memory 1400 may store, for example, sensing result data obtained by the sensor 1800. The memory 1400 may store, for example, data regarding the properties of the pollutant which are determine d based on the sensing result data. Also, the memory 1400 may store, for example, data regarding the cleaning operation determined based on the properties of the pollutant.

Also, the memory 1400 may store, for example, at least one learning model that is learned to determine the properties of the pollutant, at least one learning model that is learned to determine the cleaning operation of removing the pollutant, and the like.

Programs stored in the memory 1400 may be classified into multiple modules according to their functions.

The memory 1400 may include at least one storage medium from among a flash memory-type storage medium, a hard disk-type storage medium, a multimedia card micro-type storage medium, card-type memories (e.g., a secure digital (SD) card, an extreme digital (XD) memory, and the like), random access memory (RAM), static RAM (SRAM), read-only memory (ROM), electrically erasable programmable ROM (EEPROM), programmable ROM (PROM), magnetic memory, a magnetic disc, or an optical disc.

The camera 1500 may capture images of surroundings of the cleaning apparatus 1000. The camera 1500 may capture images of the surroundings or the bottom of the cleaning apparatus 1000 in real time while the cleaning apparatus 1000 moves to execute the cleaning operation.

The camera 1500 may include at least one image sensor (e.g., a front-facing sensor or a rear-facing sensor), a lens, an image signal processor (ISP), or flash (e.g., a light emitting diode (LED), a xenon lamp, or the like).

In addition, the camera 1500 may be a still camera or a video camera configured to record an environment outside the cleaning apparatus 1000. For example, the camera 1500 may be a plurality of cameras, and the cameras may be at various locations outside the cleaning apparatus 1000.

The navigator 1600 may include at least one driving wheel for moving the cleaning apparatus 1000. The navigator 1600 may include a driving motor connected to the at least one driving wheel and rotating the same. The at least one driving wheel may include a left wheel and a right wheel placed respectively on a left side and a right side of a body of the cleaning apparatus 1000. The left wheel and the right wheel may be driven by one driving motor, but according to the necessity, the left wheel and the right wheel may be driven respectively by a left-wheel driving motor driving the left wheel and a right-wheel driving motor driving the right wheel. In this case, a driving direction of the cleaning apparatus 1000 may be changed to the left side or the right side by differently setting the velocity of the left and right wheels.

The outputter 1700 may output an audio signal or a video signal. The outputter 1700 may include the speaker 1710 and the display 1720. The speaker 1710 may output audio data received from the communicator 1200 or stored in the memory 1400. The speaker 1710 may output sound signals regarding functions (e.g., an output of a message regarding a pollutant, an output of a message regarding a cleaning operation, a certain alarm sound, etc.) which are performed by the cleaning apparatus 1000.

The display 1720 may display information processed by the cleaning apparatus 1000. For example, the display 1720 may display a user interface for controlling the cleaning apparatus 1000, a user interface for displaying a state of the cleaning apparatus 1000, and the like.

When the display 1720 and a touch pad form a mutual layer structure and then are formed as a touch screen, the display 1720 may be used as both an output device and input device.

According to an embodiment of the disclosure, the display 1720 may display a message regarding a pollutant, a message regarding a cleaning operation, and the like.

The sensor 1800 may sense data regarding an operation and a state of the cleaning apparatus 1000 According to an embodiment of the disclosure, the sensor 1800 may sense a dirty area around the cleaning apparatus 1000. According to an embodiment of the disclosure, the sensor 1800 may sense dirt around the cleaning apparatus 1000.

Also, the sensor 1800 may detect an obstacle, the existence of a cliff, or the like around the cleaning apparatus 1000.

In addition, the sensor 1800 may further include an operation detection sensor that detects the operation of the cleaning apparatus 1000. For example, the sensor 1800 may include a gyro sensor, a wheel sensor (not shown), an acceleration sensor (not shown), and the like.

The gyro sensor may detect a rotation direction and a rotation angle of the cleaning apparatus 1000 when the cleaning apparatus 1000 moves. The wheel sensor may be connected to the left and right wheels and may detect the number of times that the left and right wheels rotate. For example, the wheel sensor may be a rotary encoder, but is not limited thereto.

Also, the sensor 1800 may include sensors for obtaining images of the surroundings of the cleaning apparatus 1000. For example, the sensor unit may include an image sensor, such as the camera 1500.

In addition, the sensor 1800 may include, for example, the UWB sensor 211 (FIG. 11), the ultrasonic sensor 212 (FIG. 11), the IR sensor 214 (FIG. 11), the RF sensor 213 (FIG. 11), a magnetic sensor 226 (FIG. 11), and a position sensitive device (PSD) sensor (not shown). However, the sensors are not limited thereto.

Because the sensor 1800 may include one or more actuators configured to change locations and/or orientations of the sensors, the sensor 1800 may sense a front direction, a rear direction, and lateral directions of the cleaning apparatus 1000, respectively.

The sensor 1800 will be described in more detail with reference to FIG. 11.

The processor 1300 may generally control the operations of the cleaning apparatus 1000. For example, the cleaning apparatus 1000 may execute programs stored in the memory 1400 and may generally control the user inputter 1100, the communicator 1200, the memory 1400, the camera 1500, the navigator 1600, the outputter 1700, and the sensor 1800. The processor 1300 may control the user inputter 1100, the communicator 1200, the memory 1400, the camera 1500, the navigator 1600, the outputter 1700, and the sensor 1800 and thus may control the operations of the cleaning apparatus 1000 of FIGS. 1 to 9.

According to an embodiment of the disclosure, the processor 1300 may use the sensor 1800 including the sensors and may determine the properties of the pollutant on the movement path of the cleaning apparatus 1000. For example, the sensors may include at least one of the RF sensor, the IR sensor, the camera, the ultrasonic sensor, or the distance sensor. For example, the properties of the pollutant may include at least one of liquid, metal, plastic, fabric, or a glutinous material.

The processor 1300 may determine the properties of the pollutant by sequentially driving the sensors according to the priorities that are set in advance.

Also, the processor 1300 may determine the properties of the pollutant by simultaneously driving the sensors.

Also, the processor 1300 may determine a cleaning operation of removing the pollutant based on the determined properties of the pollutant and may execute the determined cleaning operation.

The processor 1300 may execute at least one of the brush and the rag installed in the cleaning apparatus 1000, based on the determined properties of the pollutant.

Also, the processor 1300 may call an external cleaning apparatus through the communicator 1200 to ensure that the external cleaning apparatus (not shown) removes the pollutant based on the determined properties of the pollutant.

Also, the processor 1300 may output information regarding the properties of the pollutant through the speaker 1710.

Also, when it is determined by using the sensor 1800 that at least some of the pollutant remains after the cleaning operation is performed, the processor 1300 may re-execute at least some part of the cleaning operation.

Also, the processor 1300 may apply the sensing result using the sensor 1800 to at least one learning model that is learned to determine the properties of the pollutant and thus may determine the properties of the pollutant.

Also, the processor 1300 may apply the determined properties of the pollutant to at least one learning model that is learned to determine a cleaning operation of removing the pollutant and thus may determine the cleaning operation of removing the pollutant.

FIG. 11 is a block diagram of a sensor according to an embodiment of the disclosure.

Referring to FIG. 11, according to an embodiment of the disclosure, the cleaning apparatus 1000 may include the sensor 1800 including the sensors.

According to an embodiment of the disclosure, the sensor 1800 may sense the surroundings of the cleaning apparatus 1000. In addition, according to an embodiment of the disclosure, the sensor 1800 may capture images of the surroundings of the cleaning apparatus 1000. Also, the sensor 1800 may obtain location information of the cleaning apparatus 1000 while the cleaning apparatus 1000 moves.

The sensor 1800 may include the UWB sensor 211, the ultrasonic sensor 212, the RF sensor 213, and the IR sensor 214.

The UWB sensor 211 may identify the existence of an object by using a wideband frequency and may detect a distance to the object, a movement of the object (e.g., velocity, acceleration, etc. of the object). The UWB sensor 211 may measure a period during which pulses emitted from a transmitter hit the object, are reflected, and return to a receiver, and thus may detect the distance to the object.

According to an embodiment of the disclosure, the UWB sensor 211 may measure signals reflected from the pollutant and may determine the properties (e.g., physical properties, materials, etc.) of the pollutant based on the signals.

The ultrasonic sensor 212 may generate ultrasonic waves and may detect the object. The ultrasonic sensor 212 may detect the distance to the object, a thickness of the object, a movement of the object, and the like.

According to an embodiment of the disclosure, the ultrasonic sensor 212 may detect the pollutant and then the distance to the pollutant, a thickness of the pollutant, and the like and may measure reflection signals reflected from the pollutant, thus determining the properties (e.g., physical properties, materials, etc.) of the pollutant based on the signals.

According to an embodiment of the disclosure, the RF sensor 213 may measure signals, which are generated after emitted signals hit the pollutant and reflected therefrom, and may detect the properties (e.g., physical properties, materials, etc.) of the pollutant based on the signals.

According to an embodiment of the disclosure, the IR sensor 214 may identify an object (e.g., a pollutant) by detecting reflection signals, which are reflected from the object according to the emission of IRs, and may measure the distance to the object based on the reflection signals. In addition, according to an embodiment of the disclosure, the IR sensor 214 may detect the reflection signals reflected from the pollutant and may detect the properties (e.g., physical properties, materials, etc.) of the pollutant based on the signals.

In addition, the sensor 1800 may include sensors for obtaining location information of the cleaning apparatus 1000.

The sensor 1800 may include sensors for detecting information regarding a surrounding environment of the cleaning apparatus 1000 and at least one actuator for changing locations and/or orientations of the sensors. For example, the sensor 1800 may include a global positioning system (GPS) 215, an inertial measurement unit (IMU) 216, a radio detection and ranging, RADAR sensor 217, a light detection and ranging (LIDAR) sensor 218, an image sensor 219, and an odometry sensor 220.

The GPS 215 may be a sensor for predicting a geographical location of the cleaning apparatus 1000. For example, the GPS 215 may include a transceiver for predicting the location of the cleaning apparatus 1000 on the Earth.

The IMU 216 may be a combination of sensors for detecting changes in locations and/or orientations of the cleaning apparatus 1000 based on inertial acceleration. For example, a combination of sensors may include accelerometers and gyroscopes.

The RADAR sensor 217 may be a sensor for detecting objects in an environment in which the cleaning apparatus 1000 is located, by using wireless signals. Also, the RADAR sensor 217 may detect the velocity and/or directions of the objects.

The LIDAR sensor 218 may be a sensor for detecting objects in an environment in which the cleaning apparatus 1000 is located, by using laser beams. In more detail, the LIDAR sensor 218 may include a laser beam source for emitting laser beams and/or a laser scanner, and a detector for detecting the reflection of the laser beams. The LIDAR sensor 218 may operate in a coherent detection mode (e.g., a mode in which heterodyne detection is used) or an incoherent detection mode.

Also, the sensor 1800 may include sensors for obtaining images of the surroundings of the cleaning apparatus 1000. For example, the sensor 1800 may include the image sensor 219, such as the camera 1500 (FIG. 10).

The image sensor 219 may be a still camera or a video camera that records an external environment of the cleaning apparatus 1000. For example, the image sensor 219 may include cameras, and the cameras may be at various locations outside the cleaning apparatus 1000.

Because the sensor 1800 includes at least one actuator for changing locations and/or orientations of the sensors, the sensor 1800 may capture images of the cleaning apparatus 1000 in front, rear, and lateral directions.

The odometry sensor 220 may predict the location of the cleaning apparatus 1000 and may measure a movement distance. For example, the odometry sensor 220 may measure a location change value of the cleaning apparatus 1000 based on the number of times that wheels of the cleaning apparatus 1000 rotate.

Also, the sensor 1800 may include at least one of a temperature/humidity sensor 221, an air pressure sensor 222, a proximity sensor 223, or a red, green, blue (RGB) sensor (an illuminance sensor) 224. However, the sensors included in the sensor 1800 are not limited thereto. Functions of respective sensors may be intuitively inferred by one of ordinary skill in the art from their names, and thus detailed descriptions thereof will be omitted.

Also, the sensor 1800 may include a motion sensor 225 capable of sensing a movement of the cleaning apparatus 1000. The motion sensor 225 may include a magnetic sensor 226, an acceleration sensor 227, and a gyroscope sensor 228.

FIG. 12 is a block diagram of a server according to an embodiment of the disclosure.

Referring to FIG. 12, the server 2000 according to an embodiment of the disclosure may include the communicator 2100, a storage 2200, and a processor 2300.

The communicator 2100 may include at least one communication module for communicating with the cleaning apparatus 1000 or an external apparatus (not shown). For example, the communicator 2100 may a short-range wireless communication unit and a mobile communication unit. The short-range wireless communication unit may include a Bluetooth communication unit, a BLE communication unit, a near field communication unit, a WLAN communication unit, a ZigBee communication unit, an IrDA communication unit, a WFD communication unit, a UWB communication unit, an Ant+ communication, and the like. However, one or more embodiments of the disclosure are not limited thereto. The mobile communication unit transmits/receives wireless signals to/from at least one of a base station, an external terminal, or a server via a wireless communication network. Here, the wireless signals may include various types of data according to text/multimedia message reception/transmission, a voice call signal, and a video call signal.

The storage 2200 may store programs for controlling the operation of the server 2000. The storage 2200 may include at least one instruction for controlling the operation of the server 2000.

According to an embodiment of the disclosure, the storage 2200 may store data regarding the properties of the pollutant which are obtained from the cleaning apparatus 1000 and the cleaning operation determined based on the properties of the pollutant.

Also, the storage 2200 may store, for example, at least one learning model that is learned to determine the properties of the pollutant, at least one learning model that is learned to determine the cleaning operation of removing the pollutant, and the like.

The programs stored in the storage 2200 may be classified into modules according to functions.

Also, the storage 2200 may include multiple databases for integrated management of user identifiers (IDs) of multiple users, sensing information regarding a pollutant, which is received from various cleaning apparatuses, sensing data of various external apparatuses, and the like.

The processor 2300 may generally control the operations of the server 2000. For example, the processor 2300 may execute programs stored in the storage 2200 and may control the communicator 2100 and the storage 2200. The processor 2300 may control the communicator 2100 and the storage 2200 and thus control the operations of the server 2000 which are shown in FIGS. 1 to 9.

The processor 2300 may determine the properties (e.g., liquid, metal, viscosity, etc.) of the pollutant, based on the sensing result received from the cleaning apparatus 1000.

Also, the processor 2300 may determine the cleaning operation of removing the pollutant, based on the properties of the pollutant.

Also, the processor 2300 may apply information regarding the sensing result, which is received from the cleaning apparatus 1000, to at least one learning model that is learned to determine the properties of the pollutant, thereby determining the properties of the pollutant.

In addition, the processor 2300 may apply the properties of the pollutant to at least one learning model that is learned to determine the cleaning operation of removing the pollutant, thereby determining the cleaning operation of removing the pollutant.

The processor 2300 may use the ID of the user to manage the cleaning apparatus 1000.

Figure 13:
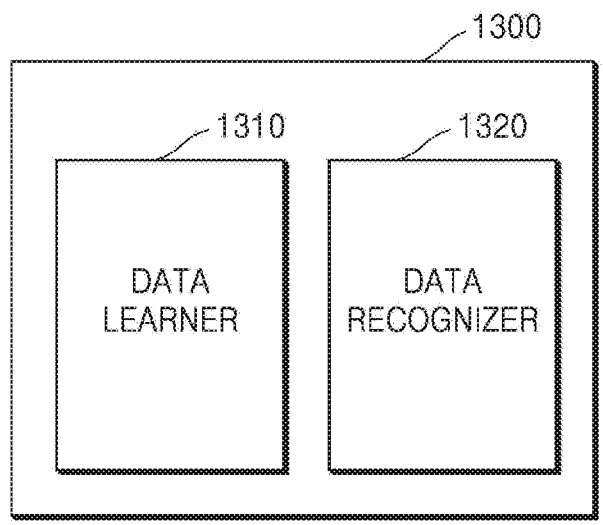
FIG. 13 is a block diagram of a processor according to an embodiment of the disclosure.

FIG. 13 is a block diagram of a processor according to an embodiment of the disclosure.

Referring to FIG. 13, the processor 1300 may include a data learner 1310 and a data recognizer 1320.

The data learner 1310 may learn criteria for determining at least one of properties of a pollutant or a cleaning operation. The data learner 1310 may learn criteria as to which data will be used to determine at least one of the properties of the pollutant or the cleaning operation and as to how the at least one of the properties of the pollutant or the cleaning operation will be determined based on the data.

The data learner 1310 may obtain the data to be used for the learning and apply the obtained data to a data determination model described below, thereby learning the criteria for determining at least one of the determination of the properties of the pollutant or the determination of the cleaning operation.

The data recognizer 1320 may determine at least one of the properties of the pollutant or the cleaning operation, based on data. The data recognizer 1320 may use the learned data determination model and may determine at least one of the properties of the pollutant or the cleaning operation, based on certain data. The data recognizer 1320 may obtain certain data according to the criteria that are set for the learning and may use the data determination model by using the obtained data as input values, thereby determining at least one of the properties of the pollutant or the cleaning operation.

In addition, values, which are output by the data determination model by using the obtained data as the input values, may be used to update the data determination model.

At least one of the data learner 1310 or the data recognizer 1320 may be manufactured as at least one hardware chip and embedded in an electronic apparatus. For example, at least one of the data learner 1310 or the data recognizer 1320 may be manufactured as a hardware chip exclusively for artificial intelligence (AI) or as part of an existing general-use processor (e.g., a central processing unit (CPU) or an application processor) or a graphic processor (e.g., a graphics processing unit (GPU)) and thus may be embedded in the above-described electronic apparatuses.

In this case, the data learner 1310 or the data recognizer 1320 may be embedded in an electronic apparatus or may be respectively embedded in electronic apparatuses. For example, one of the data learner 1310 or the data recognizer 1320 may be included in an electronic apparatus, and the other thereof may be included in the server 2000. Also, the data learner 1310 or the data recognizer 1320 may provide the data recognizer 1320 with model information built by the data learner 1310 or provide the data learner 1310 with data that is input to the data recognizer 1320 as additional learning data, in a wired or wireless manner At least one of the data learner 1310 or the data recognizer 1320 may be realized as a software module. When at least one of the data learner 1310 or the data recognizer 1320 is realized as a software module (or a program module including instructions), the software module may be stored in non-transitory computer-readable media that may be readable by a computer. Also, in this case, at least one software module may be provided by an operating system (OS) or a certain application. Alternatively, some of the at least one software module may be provided by an OS, and the other thereof may be provided by a certain application.

Figure 14:
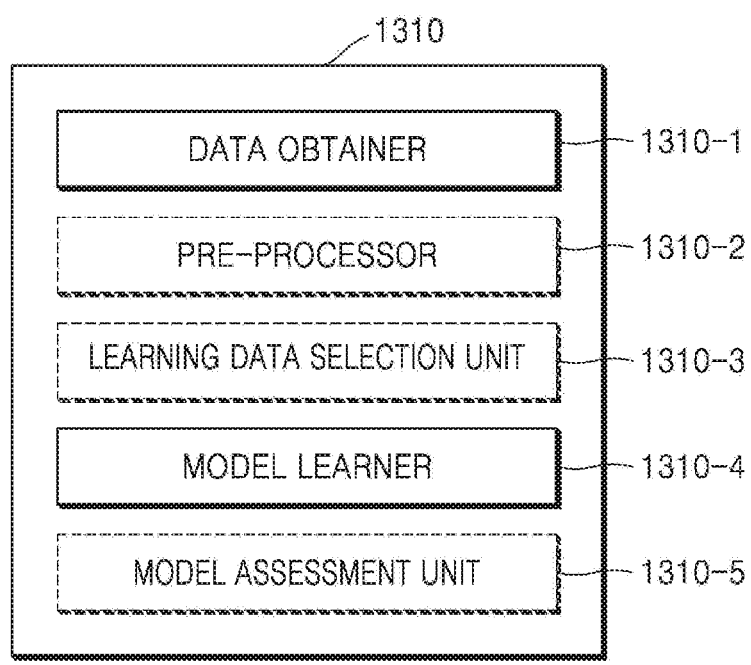
FIG. 14 is a block diagram of a data learner according to an embodiment of the disclosure.

FIG. 14 is a block diagram of a data learner according to an embodiment of the disclosure.

Referring to FIG. 14, the data learner 1310 may include a data obtainer 1310-1, a pre-processor 1310-2, a learning data selection unit 1310-3, a model learner 1310-4, and a model assessment unit 1310-5.

The data obtainer 1310-1 may obtain data necessary for at least one of the determination of the properties of the pollutant or the determination of the cleaning operation. The data obtainer 1310-1 may obtain data necessary to learn at least one of the determination of the properties of the pollutant or the determination of the cleaning operation.

For example, at least one of the images captured by the cleaning apparatus 1000, the sensing result data sensed in the cleaning apparatus 1000, the images captured by the external apparatus (not shown), the sensing data sensed in the external apparatus (not shown), information regarding a state of a cleaning space, or information regarding a state of the cleaning apparatus 1000 may be obtained for the learning. However, the data obtained for the learning is not limited thereto. For example, data that may be input to the learning models of FIGS. 8 and 9 may be obtained for the learning.

The pre-processor 1310-2 may pre-process the obtained data to allow the obtained data to be used for the learning of at least one of the determination of the properties of the pollutant or the determination of the cleaning operation. The pre-processor 1310-2 may process the obtained data into a preset format so that the model learner 1310-4 described below may use the obtained data for the learning of at least one of the determination of the properties of the pollutant or the determination of the cleaning operation.

The learning data selection unit 1310-3 may select data necessary for the learning from among the pre-processed data. The selected data may be provided to the model learner 1310-4. The learning data selection unit 1310-3 may select the data necessary for the learning from among the pre-processed data, according to the criteria that are set to determine at least one of the properties of the pollutant or the cleaning operation. Also, the learning data selection unit 1310-3 may select data according to the criteria that are set by the learning of the model learner 1310-4 described below.

The model learner 1310-4 may learn the criteria for determining at least one of the properties of the pollutant and the cleaning operation. Also, the model learner 1310-4 may learn the criteria regarding which learning data has to be used to determine at least one of the properties of the pollutant or the cleaning operation.

Also, the model learner 1310-4 may learn a data determination model used to determine at least one of the properties of the pollutant and the cleaning operation, based on learning data. In this case, the data determination model may be a model that is built in advance. For example, the data determination model may be a model that is built in advance by receiving basic learning data.

The data determination model may be built by considering an application field of a recognition model, a learning purpose, computer performance of an application, and the like. The data determination model may be, for example, a model based on a neural network. For example, models, such as a deep neural network (DNN), a recurrent neural network (RNN), and a bidirectional recurrent deep neural network (BRDNN) may be used as data determination models. However, the models are not limited thereto.

According to one or more embodiments of the disclosure, when there are multiple data determination models that are built in advance, the model learner 1310-4 may determine, as a data determination model that is to be learned, a data determination model having a high relevance between input learning data and basic learning data. In this case, the basic learning data may be already classified according to types of data, and the data determination model may be built in advance according to the types of data. For example, the basic learning data may be already classified according to various criteria, such as a region where the learning data is generated, a time when the learning data is generated, a size of the learning data, a genre of the learning data, a generator of the learning data, and types of objects in the learning data.

Also, the model learner 1310-4 may learn the data determination model by using a learning algorithm including, for example, an error back propagation method or a gradient descent method, and the like.

Also, the model learner 1310-4 may learn the data determination model through, for example, supervised learning using the learning data as input values. Also, for example, the model learner 1310-4 may learn by itself types of data necessary to determine situations without any supervision and may learn the data determination model through unsupervised learning by which criteria for determining the situations are found. In addition, for example, the model learner 1310-4 may learn the data determination model through reinforcement learning using feedback as to whether a result of determining the situations according to the learning is right.

Moreover, when the data determination model is learned, the model learner 1310-4 may store the learned data determination model. In this case, the model learner 1310-4 may store the learned data determination model in a memory of an electronic apparatus including the data recognizer 1320. Alternatively, the model learner 1310-4 may store the learned data determination model in a memory of an electronic apparatus including the data recognizer 1320 described below. Alternatively, the model learner 1310-4 may store the learned data determination model in a memory of a server connected to the electronic apparatus via a wired or wireless network.

In this case, the memory configured to store the learned data determination model may store, for example, instructions or data relevant to at least one component of the electronic apparatus. Also, the memory may store software and/or programs. Programs may include, for example, kernel, middleware, an application programming interface (API), an application program (or an "application"), and/or the like.

The model assessment unit 1310-5 may input assessment data to the data determination model, and when a recognition result output from the assessment data does not satisfy certain criteria, the model assessment unit 1310-5 may make the model learner 1310-4 learn again. In this case, the assessment data may be data that is set in advance to assess the data determination model.

For example, when the number or a ratio of pieces of assessment data of which recognition results are not accurate among recognition results of the data determination model that is learned with respect to the assessment data, exceeds a threshold value, the model assessment unit 1310-5 may assess that the data determination model fails to satisfy the certain criteria. For example, when the certain criteria are defined as a ratio of 2%, and when the learned data determination model outputs incorrect recognition results with regard to at least 20 out of 1000 pieces of the assessment data, the model assessment unit 1310-5 may assess that the learned data determination model is not appropriate.

When multiple learned data determination models are present, the model assessment unit 1310-5 may assess whether each learned data determination model satisfies certain criteria and may determine a model satisfying the certain criteria as a final data determination model. In this case, when there are multiple models satisfying the certain criteria, the model assessment unit 1310-5 may determine, as a final data determination model, any one or the certain number of models that are set in advance in an order of high scores.

At least one of the data obtainer 1310-1, the pre-processor 1310-2, the learning data selection unit 1310-3, the model learner 1310-4, or the model assessment unit 1310-5 may be manufactured as at least one hardware chip and embedded in an electronic apparatus. For example, at least one of the data obtainer 1310-1, the pre-processor 1310-2, the learning data selection unit 1310-3, the model learner 1310-4, or the model assessment unit 1310-5 may be manufactured as a hardware chip exclusively for AI or as part of an existing general-use processor (e.g., a CPU or an application processor) or a graphic processor (e.g., a GPU) and thus may be embedded in the above-described electronic apparatuses.

Also, the data obtainer 1310-1, the pre-processor 1310-2, the learning data selection unit 1310-3, the model learner 1310-4, or the model assessment unit 1310-5 may be embedded in an electronic apparatus or may be respectively embedded in electronic apparatuses. For example, some of the data obtainer 1310-1, the pre-processor 1310-2, the learning data selection unit 1310-3, the model learner 1310-4, or the model assessment unit 1310-5 may be embedded in an electronic apparatus, and the others thereof may be included in the server 2000.

Additionally, at least one of the data obtainer 1310-1, the pre-processor 1310-2, the learning data selection unit 1310-3, the model learner 1310-4, or the model assessment unit 1310-5 may be realized as a software module. When at least one of the data obtainer 1310-1, the pre-processor 1310-2, the learning data selection unit 1310-3, the model learner 1310-4, or the model assessment unit 1310-5 is realized as a software module (or a program module including instructions), the software module may be stored in non-transitory computer-readable media that may be readable by a computer. Also, in this case, at least one software module may be provided by an OS or a certain application. Alternatively, some of the at least one software module may be provided by an OS, and the others thereof may be provided by a certain application.

Figure 15:
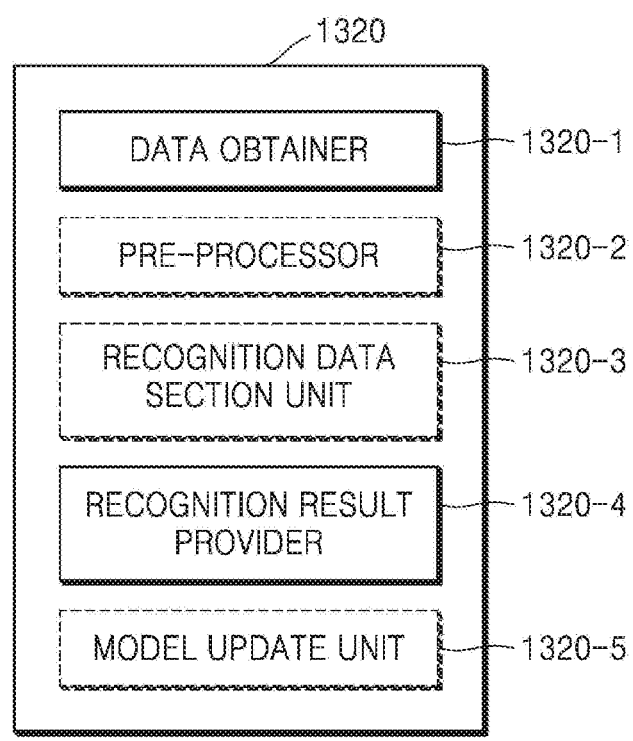
FIG. 15 is a block diagram of a data recognizer according to an embodiment of the disclosure.

FIG. 15 is a block diagram of a data recognizer according to an embodiment of the disclosure.

Referring to FIG. 15, the data recognizer 1320 may include a data obtainer 1320-1, a pre-processor 1320-2, a recognition data selection unit 1320-3, a recognition result provider 1320-4, and a model update unit 1320-5.

The data obtainer 1320-1 may obtain the data necessary to determine at least one of the properties of the pollutant or the cleaning operation, and the pre-processor 1320-2 may pre-process the obtained data to allow the obtained data to be used to determine at least one of the properties of the pollutant or the cleaning operation. The pre-processor 1320-2 may process the obtained data into a preset format to ensure that the recognition result provider 1320-4 described below uses the obtained data to determine at least one of the properties of the pollutant or the cleaning operation.

The recognition data selection unit 1320-3 may select the data necessary to determine at least one of the properties of the pollutant or the cleaning operation, the data being selected from among the pre-processed data. The selected data may be provided to the recognition result provider 1320-4. The recognition data selection unit 1320-3 may select some or all pieces of the pre-processed data according to the criteria that are set in advance to determine at least one of the properties of the pollutant or the cleaning operation. Also, the recognition data selection unit 1320-3 may select the data according to the criteria that are set in advance based on the learning of the model learner 1310-4 described below.

The recognition result provider 1320-4 may apply the selected data to the data determination model and may determine at least one of the properties of the pollutant or the cleaning operation. The recognition result provider 1320-4 may provide a recognition result according to a recognition purpose of data. The recognition result provider 1320-4 may use the data selected by the recognition data selection unit 1320-3 as input values and thus may apply the selected data to the data determination model. Also, the recognition result may be determined by the data determination model.

For example, at least one of images captured by the cleaning apparatus 1000, sensing result data sensed in the cleaning apparatus 1000, images captured by an external apparatus (not shown), sensing result data sensed in the external apparatus (not shown), information regarding a situation in a cleaning space, or information regarding a state of the cleaning apparatus 1000 may be obtained for the recognition. However, the data obtained for the recognition is not limited thereto. For example, data that may be input to the learning models of FIGS. 8 and 9 may be obtained for the recognition.

The model update unit 1320-5 may allow the data determination model to be updated based on an assessment regarding the recognition result provided by the recognition result provider 1320-4. For example, the model update unit 1320-5 may provide the model learner 1310-4 with the recognition result provided by the recognition result provider 1320-4, and thus the model learner 1310-4 may update the data determination model.

At least one of the data obtainer 1320-1, the pre-processor 1320-2, the recognition data selection unit 1320-3, the recognition result provider 1320-4, or the model update unit 1320-5 included in the data recognizer 1320 may be manufactured as at least one hardware chip and embedded in an electronic apparatus. For example, at least one of the data obtainer 1320-1, the pre-processor 1320-2, the recognition data selection unit 1320-3, the recognition result provider 1320-4, and the model update unit 1320-5 may be manufactured as a hardware chip exclusively for AI or as part of an existing general-use processor (e.g., a CPU or an application processor) or a graphic processor (e.g., a GPU) and thus may be embedded in the above-described electronic apparatuses.

Also, the data obtainer 1320-1, the pre-processor 1320-2, the recognition data selection unit 1320-3, the recognition result provider 1320-4, and the model update unit 1320-5 may be embedded in one electronic apparatus or may be respectively embedded in electronic apparatuses. For example, some of the data obtainer 1320-1, the pre-processor 1320-2, the recognition data selection unit 1320-3, the recognition result provider 1320-4, and the model update unit 1320-5 may be included in an electronic apparatus, and the others thereof may be included in the server 2000.

Also, at least one of the data obtainer 1320-1, the pre-processor 1320-2, the recognition data selection unit 1320-3, the recognition result provider 1320-4, or the model update unit 1320-5 may be realized as a software module. When at least one of the data obtainer 1320-1, the pre-processor 1320-2, the recognition data selection unit 1320-3, the recognition result provider 1320-4, or the model update unit 1320-5 is realized as a software module (or a program module including instructions), the software module may be stored in non-transitory computer readable media that may be readable by a computer. Also, in this case, at least one software module may be provided by an OS or a certain application. Alternatively, some of the at least one software module may be provided by an OS, and the others thereof may be provided by a certain application.

Figure 16:
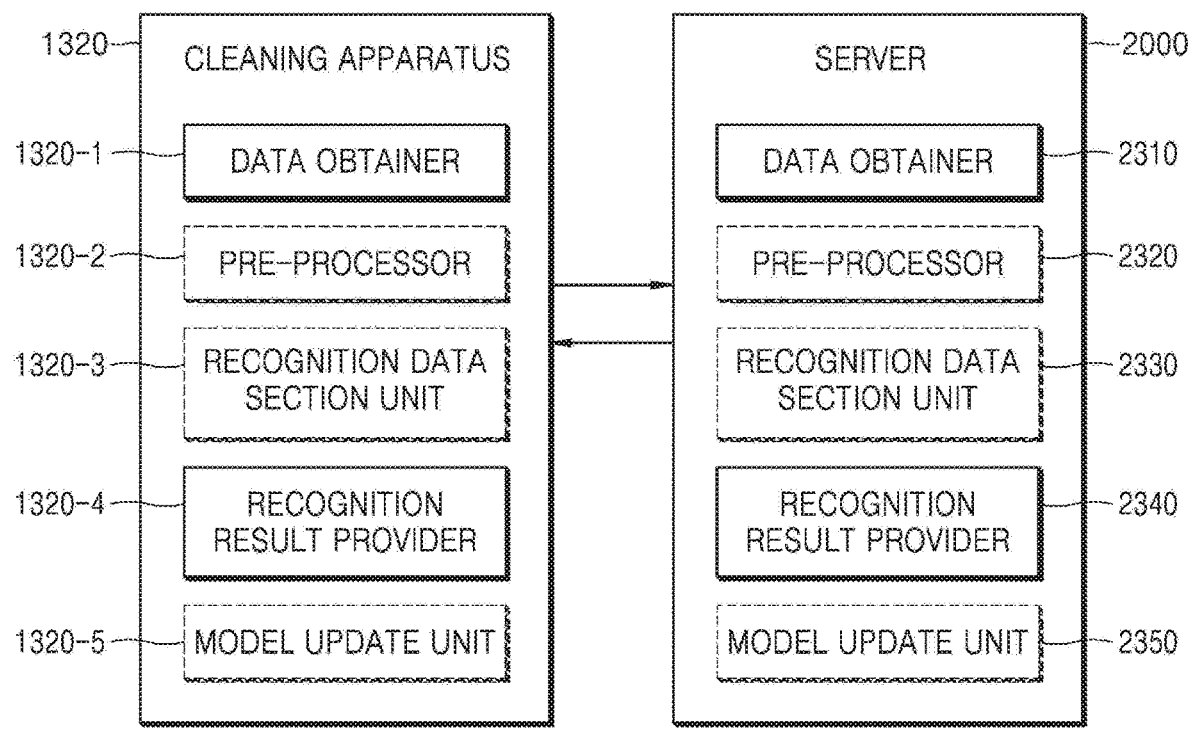
FIG. 16 is a diagram illustrating a cleaning apparatus learns and recognizes data while interworking with a server according to an embodiment of the disclosure.

FIG. 16 is a diagram illustrating a cleaning apparatus learns and recognizes data while interworking with the server according to an embodiment of the disclosure.

Referring to FIG. 16, the server 2000 includes a data obtainer 2310, a pre-processor 2320, a recognition data section unit 2330, a recognition result 2340, and a model update unit 2350. The server 2000 may learn criteria for determining at least one of the properties of the pollutant or the cleaning operation, and a robotic cleaning apparatus may determine at least one of the properties of the pollutant or the cleaning operation based on a learning result obtained by the server 2000.

In this case, a data obtainer 2310 of the server 2000 may perform the functions of the data learner 1310 of FIG. 14. The data obtainer 2310 of the server 2000 may learn the criteria as to which data will be used to determine at least one of the properties of the pollutant or the cleaning operation and criteria for determining at least one of the properties of the pollutant or the cleaning operation. The data obtainer 2310 may obtain data to be used for the learning, may apply the obtained data to a data determination model described below, and thus may learn the criteria for determining at least one of the properties of the pollutant or the cleaning operation.

Also, the recognition result provider 1320-4 of the cleaning apparatus 1000 may apply the data selected by the recognition data selection unit 1320-3 to the data determination model generated by the server 2000 and thus may determine at least one of the properties of the pollutant and the cleaning operation. For example, the recognition result provider 1320-4 may transmit the data selected by the recognition data selection unit 1320-3 to the server 2000, and the server 2000 may apply the data selected by the recognition data selection unit 1320-3 to the data determi-
nation model. Thus, a request for determining at least one of the properties of the pollutant or the cleaning operation may be transmitted to the server 2000. Also, the recognition result provider 1320-4 may receive information determined by the server 2000 to the server 2000.

Alternatively, the recognition result provider 1320-4 of the cleaning apparatus 1000 may receive, from the server 2000, the data determination model generated by the server 2000 and may use the received recognition model, thereby determining at least one of the properties of the pollutant or the cleaning operation. In this case, the recognition result provider 1320-4 of the cleaning apparatus 1000 may apply the data selected by the recognition data selection unit 1320-3 to the data determination model received from the server 2000.

One or more embodiments of the disclosure may be embodied as recording media including instructions executable by a computer, such as a program module executed by the computer. Computer-readable recording media may be arbitrary media accessible by the computer and include volatile and non-volatile media and removable and non-removable media. Also, the computer-readable recording media may include computer storage media. The computer storage media may include computer-readable instructions, data structures, volatile and non-volatile media realized by an arbitrary method or arbitrary technology to store program modules or information, such as data, and removable and non-removable media.

Also, in the specification, the term "unit" may be a hardware component, such as a processor or a circuit, and/or a software component executed by a hardware component, such as a processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cleaning apparatus comprising:
a sensor comprising a plurality of sensors;
a memory configured to store at least one instruction; and
a processor configured to:
   execute the at least one instruction to control the cleaning apparatus,
   determine properties of a pollutant on a movement path of the cleaning apparatus by using the sensor,
   determine a cleaning operation of removing the pollutant, based on the determined properties of the pollutant, and
   execute the determined cleaning operation,
wherein, when it is determined by using the sensor that at least some of the pollutant still remains after the cleaning operation is executed, the processor is further configured to execute the at least one instruction to re-execute at least part of the cleaning operation.

2. The cleaning apparatus of claim 1, wherein the processor is further configured to execute the at least one instruction to:
adjust at least one of a suction force for sucking the pollutant, a suction time taken to suck the pollutant, a movement velocity of the cleaning apparatus while the pollutant is being sucked, or a number of times that an operation of sucking the pollutant is repeated, based on the determined properties of the pollutant.

3. The cleaning apparatus of claim 1, wherein the plurality of sensors comprise at least one of a radio frequency (RF) sensor, an infrared ray (IR) sensor, a camera, an ultrasonic sensor, or a distance sensor.

4. The cleaning apparatus of claim 1, wherein the processor is further configured to execute the at least one instruction to:
determine the properties of the pollutant by sequentially driving the plurality of sensors according to priorities that are set in advance.

5. The cleaning apparatus of claim 1, wherein the processor is further configured to execute the at least one instruction to:
determine the properties of the pollutant by simultaneously driving the plurality of sensors.

6. The cleaning apparatus of claim 1, wherein the properties of the pollutant comprise at least one of liquid, metal, plastic, fabric, or a glutinous material.

7. The cleaning apparatus of claim 1, wherein the processor is further configured to execute the at least one instruction to:
drive at least one of a brush and a rag installed in the cleaning apparatus, based on the determined properties of the pollutant.

8. The cleaning apparatus of claim 1, further comprising:
a communicator,
wherein the processor is further configured to execute the at least one instruction to call an external cleaning apparatus through the communicator to ensure the external cleaning apparatus removes the pollutant, based on the determined properties of the pollutant.

9. The cleaning apparatus of claim 1, further comprising a speaker,
wherein the processor is further configured to execute the at least one instruction to output information regarding the properties of the pollutant through the speaker.

10. The cleaning apparatus of claim 1, wherein the processor is further configured to execute the at least one instruction to apply a sensing result obtained by using the sensor to at least one learning model that is learned to determine the properties of the pollutant and thus to determine the properties of the pollutant.

11. The cleaning apparatus of claim 1, wherein the processor is further configured to execute the at least one instruction to apply the determined properties of the pollutant to at least one learning model that is learned to determine the cleaning operation of removing the pollutant and thus to determine the properties of the pollutant.

12. An operating method of a cleaning apparatus, the method comprising:
determining properties of a pollutant on a movement path of the cleaning apparatus by using a sensor comprising a plurality of sensors;
determining a cleaning operation of removing the pollutant, based on the determined properties of the pollutant; and
executing the determined cleaning operation,
wherein the method further comprises, when it is determined by using the sensor that at least some of the pollutant still remains after the cleaning operation is executed, re-executing at least part of the cleaning operation.

13. The method of claim 12, wherein the determining of the cleaning operation comprises adjusting at least one of a suction force for sucking the pollutant, a suction time taken to suck the pollutant, a movement velocity of the cleaning apparatus while the pollutant is sucked, or a number of times that an operation of sucking the pollutant is repeated, based on the determined properties of the pollutant.

14. The method of claim 12, wherein the determining of the properties comprises determining the properties of the pollutant by sequentially driving the plurality of sensors, based on priorities that are set in advance.

15. The method of claim 12, wherein the determining of the properties comprises determining the properties of the pollutant by simultaneously driving the plurality of sensors.

16. The method of claim 12, wherein the determining of the cleaning operation comprises determining at least one of a brush and a rag installed in the cleaning apparatus, based on the determined properties of the pollutant.

17. The method of claim 12, wherein the determining of the cleaning operation comprises determining to call an external cleaning apparatus through a communicator to ensure the external cleaning apparatus removes the pollutant, based on the determined properties of the pollutant.

18. A computer program product comprising at least one non-transitory computer-readable recording medium having recorded thereon a program which, when executed by a computer, executes the operating method of claim 12.

* * * * *